May 6, 1947.  J. A. LINKS  2,419,961
MOTION PICTURE PROJECTION APPARATUS
Filed June 9, 1944  2 Sheets-Sheet 1
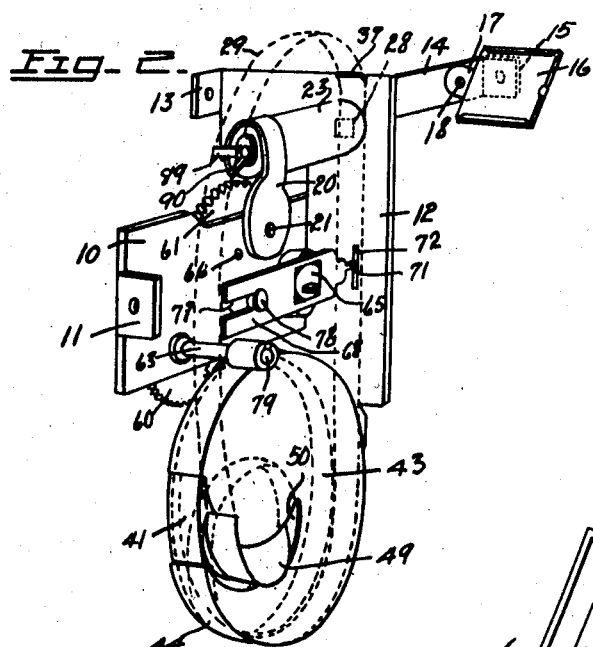
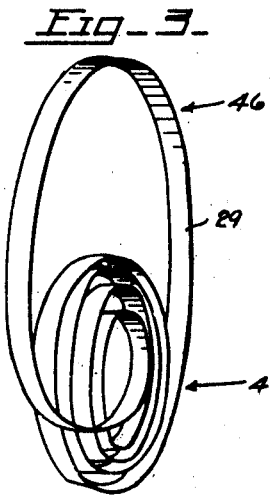
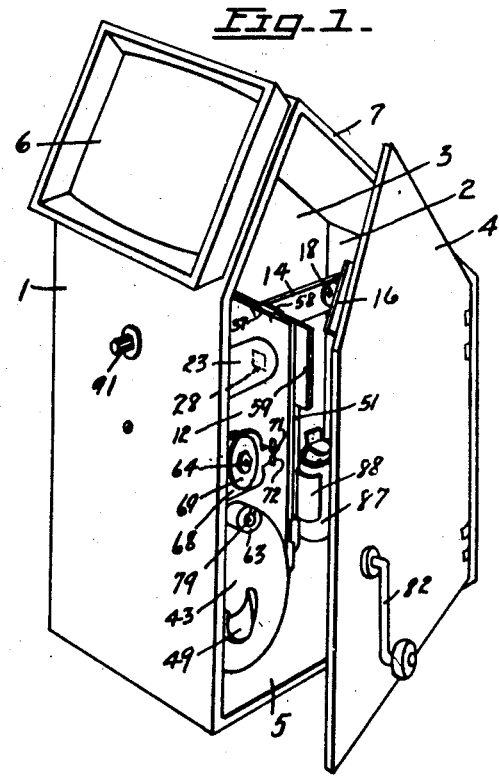
INVENTOR.
JULIAN A. LINKS
BY
Boyken, Mohler & Beckley
ATTORNEYS.

May 6, 1947. J. A. LINKS 2,419,961
MOTION PICTURE PROJECTION APPARATUS
Filed June 9, 1944 2 Sheets-Sheet 2
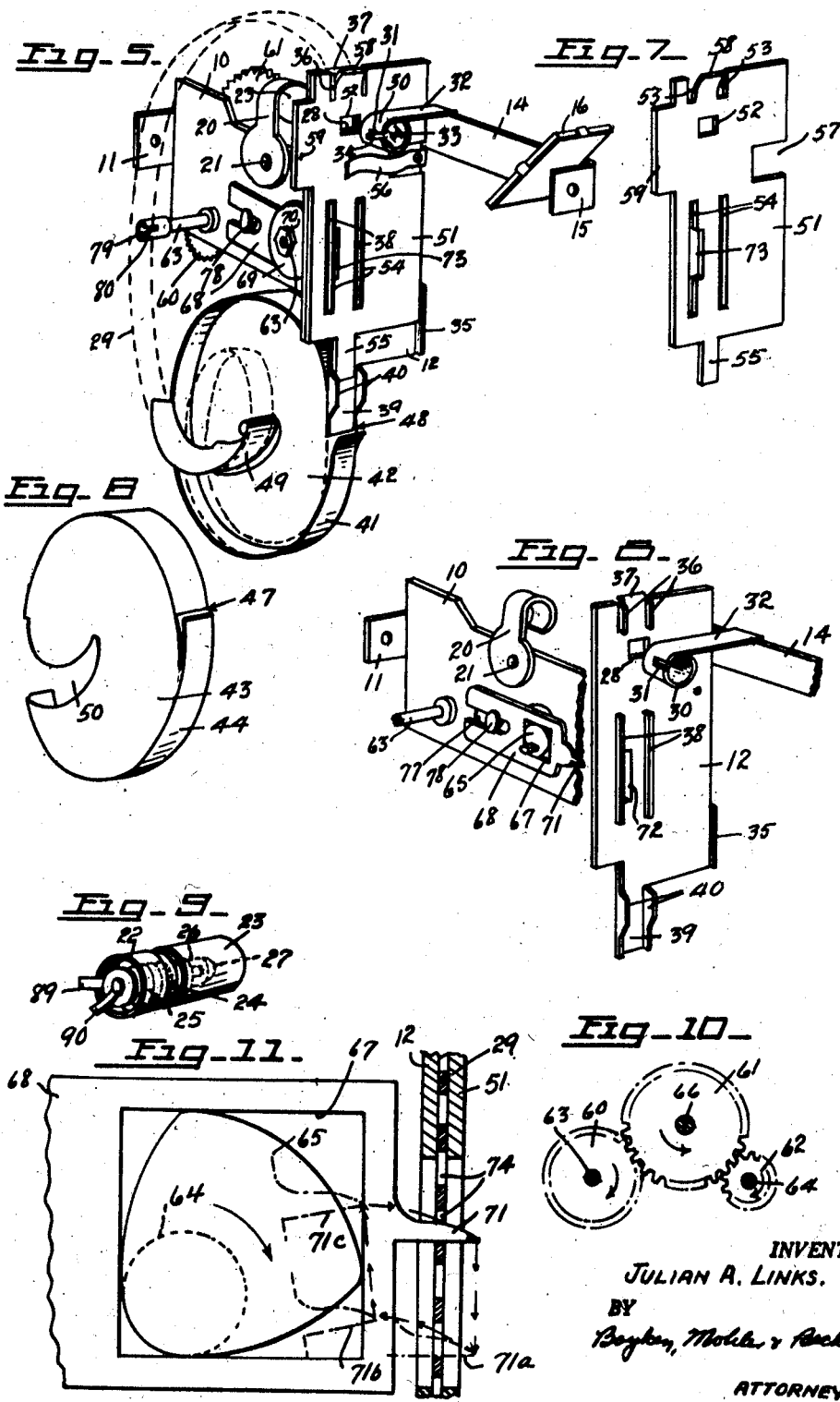
INVENTOR.
JULIAN A. LINKS.
BY
ATTORNEYS.

Patented May 6, 1947

2,419,961

UNITED STATES PATENT OFFICE 2,419,961

MOTION-PICTURE PROJECTION APPARATUS

Julian A. Links, San Francisco, Calif.

Application June 9, 1944, Serial No. 539,444

8 Claims. (Cl. 88—18.7)

This invention relates to motion picture projection apparatus and has for one of its objects an improved structure and design for a more compact, simple, rugged and economical motion picture cabinet than heretofore, and which cabinet has a larger capacity for film, such as the conventional 8 mm. or 16 mm. size, for the size of the cabinet itself, than has heretofore been provided.

Another object of the invention is the provision of a miniature or toy size motion picture projection cabinet adapted to project a relatively large image from conventional size motion picture film on a screen in one wall of the cabinet.

In the production of such miniature or toy size cabinet which, including the projection apparatus only weighs a few pounds, three factors must be observed, namely: compactness with a maximum sized clear image on the screen and economy of manufacture. The provision of improved structure in such cabinet whereby a lamp-reflector, shutter, and drive sprockets are eliminated without apparent sacrifice in the quality and brilliance of the projected picture, contributes toward the desired end, and which structure is one of the objects of the invention.

A still further object of the invention is the provision of a continuous rewind arrangement for the film in a miniature or toy size cabinet whereby a single drive element (not a sprocket wheel) for the film is all that is required, and which drive element is so actuated as to drive the film free from objectional abrasion or wear in the conventional sprocket holes normally provided in conventional film for driving the same. Also such drive element is so actuated as to eliminate the use of a shutter, or revolving prism, or light, as has heretofore been used.

Other objects and advantages will appear in the description and drawings.

In the drawings,

Fig. 1 is a perspective view of a motion picture projection cabinet with the door partially open to disclose generally the interior, less the film itself.

Fig. 2 is an enlarged perspective view of the projection unit that is in the cabinet of Fig. 1 in substantially the same position as it is indicated in the cabinet of Fig. 1. An endless film is indicated in dotted line.

Fig. 3 is a perspective view of an endless film (less the conventional marginal holes for sprocket) arranged for insertion in the projection unit of Fig. 2.

Fig. 4 is a part sectional, part elevational fragmentary view of the crank and clutch mechanism for driving the projection unit.

Fig. 5 is a perspective view of the projection unit of Fig. 2 as seen from a different angle for showing the film guide and film pressure plate, and in which view the film container is shown without its removable closure.

Fig. 6 is a perspective view of the closure for the film container of the projection unit separate therefrom.

Fig. 7 is a perspective view of the film pressure plate of the projection unit separate from the unit.

Fig. 8 is a perspective view of parts of the projection unit, partly separated and in section, and without the film pressure plate of Fig. 6 so as to disclose the film supporting plate and film track as well as the film drive.

Fig. 9 is a perspective view of the lamp housing separate from the projection unit with the portion for holding the lamp socket slightly spaced from the housing to more clearly show the structure.

Fig. 10 is a fragmentary elevational view of the gearing for driving the rotary cam element that in turn drives the film moving element.

Fig. 11 is a greatly enlarged semi-diagrammatic view showing the several successive positions of the film driving element as it is actuated by rotation of the cam.

In detail, the cabinet itself, as disclosed in Fig. 1, may comprise a front wall 1, rear wall 2, fixed side wall 3, and a door 4 hinged at 5 to rear wall 2 for swinging to and from a position forming the side wall opposed to wall 3. The base or bottom wall 5 closes the lower end of the cabinet, while the top may be closed by convergent extensions of the front and rear walls in the form of an inverted V, one side of which is formed with an opening in which is fitted a rectangular viewing screen 6 of a suitable light transmitting, translucent material, while the other side 7 is opaque. The door 4 is preferably of inverted V shape at its upper end to follow the edges of the said convergent extensions of the front and rear wall.

The projector unit itself is adapted to be assembled outside the cabinet and to be installed as a unit. The said projector comprises a vertically disposed plate 10 formed with an apertured ear 11 at one end for securing the plate to the front wall 1 of the cabinet by a screw or bolt extending through the aperture in said ear and into said wall. The opposite end of plate 10 carries a film supporting plate 12 that is disposed at right angles to plate 10 and which plates 10, 12 are preferably integral at their juncture and stamped from the same sheet of metal, where it is made of metal. The plate 12 may be formed with an apertured ear 13 for securing to the wall 3 of the cabinet in the same manner as ear 11 is secured to the front wall.

Also integrally connected with plate 12 may be an arm 14 projecting from an edge thereof in a direction opposite to the direction in which plate 10 extends therefrom. The outer end portion 15 of said arm is bent at right angles to the main body of the arm (Fig. 5) and said end portion is apertured for screwing or bolting of the same to wall 2 of the cabinet.

A reflector in the form of a flat mirror 16 is carried on a bracket 17, and said bracket is pivotally secured at 18 to arm 14 adjacent the end portion 15 thereof. The pivot 18 is tightened sufficiently to hold the mirror at any desired angle, and if desired, a conventional friction disk may be used in association with the pivot.

The plate 10 carries a bracket 20 that projects upwardly from said plate. This bracket is pivotally secured to said plate 10 by a pivot 21 that is sufficiently tight to hold the bracket in any adjusted position upon swinging the bracket on said pivot. The bracket swings in a plane parallel with plate 10 and carries a cylindrical, tubular lamp housing at its upper end. This housing is in two sections 22, 23, the section 22 being shorter than section 23 and being secured to the latter section by an annular lip 24 that frictionally fits within one end of said section 21 (Fig. 9). The bracket 20 is secured to section 22, and normally the coaxial sections 22, 23 are horizontal with the free end of section 23 opposite section 22 substantially in engagement with the flat side of plate 12 that faces toward said bracket and housing. However, the pivot 21 permits swinging of the sections 22, 23 rearwardly or upwardly and away from plate 12 whereby section 23 may readily be withdrawn from section 22.

The section 22 is internally threaded to provide a socket for the threaded base 25 of an electric light bulb 26, and said bulb is integrally formed on its side opposite said base with a condenser lens 27 for concentrating the light rays in a direction toward the outer open end of section 23 that is adjacent plate 12. The base 25 thereby closes the end of the tubular housing that is opposite the plate 12, and there is no lamp reflector in the housing, nor is there any condenser lens in the lamp housing separate from the light bulb. The latter projects into section 23 and is readily removable from section 22 for replacement upon swinging the lamp housing on pivot 21 away from plate 12 and thereafter removing section 23.

The plate 12 is formed with a rectangular opening 28 (Fig. 8) that is coaxial with the lamp housing when the latter is substantially horizontal as seen in Fig. 2. The edges of opening 28 are disposed within the confines of the open outer end of section 23 and the dimensions of said opening substantially correspond with those of each frame of a conventional motion picture film 29 to be used in the cabinet and with the projector.

At the side of plate 12 opposite the lamp housing is a cylindrical, open-ended tube 30 (Fig. 8) formed in one side with a slot 31 extending axially of said tube. This tube is preferably formed on one end of an arm 32, and the latter end of said arm 32 is preferably integrally connected with arm 14 and projects laterally from said arm so that tube 30 is coaxial with the lamp housing when the latter is aligned over opening 28. The tube 30 is spaced slightly from plate 12, as will later be explained.

Within tube 30 is a focusing lens 33 (Fig. 5) provided with a projection 34 extending through slot 35 and in sufficient frictional engagement with tube 30 to hold the focusing lens in any adjusted position axially within tube 30.

The plate 12 is formed at its upper end with a pair of vertical, parallel tracks 36 spaced apart the width of a conventional motion picture film. Above said tracks the plate 12 is formed with an upward projection or lip 37 that is curved forwardly toward the forward side of the cabinet. This lip above the space between tracks 36 and the opening 28, is below said space so that a vertical strip of film passing over lip 37 and downwardly between tracks 36 will pass across opening 28. Also a rib 35 is formed along one of the edges of plate 12.

The lower end of plate 12 is formed with a downwardly projecting strip 39 having laterally offset marginal portions in alignment with the tracks 36, 38, thereby forming a third pair of guide tracks 40 for film.

At a level below plate 10 and in the same plane as strip 39, but perpendicular to the flat sides of the latter, is a flattened, drum-like film container. This container has a cylindrical peripheral wall 41 that extends substantially tangentially of strip 39 from the lower end of the latter, and to which strip the container is secured. One vertical side wall 42 of the film container is fixed while the other side wall 43 that is parallel with side wall 42 is formed with a peripheral wall 44 frictionally engaging the wall 41 for forming a removable closure for said container. This closure is on the side of the container facing door 4, hence when door 4 is opened, the closure may be removed for insertion of a film or for replacement or removal of a film.

The particular container illustrated is for use in connection with an endless strip of film 29 as seen in Fig. 3, and which film is arranged to provide a spiral reel portion generally designated 45 and a loop portion generally designated 46. One end of the loop 46 feeds to the outside coil of the reel while the other end connects with the inside coil for withdrawal. The reel portion is adapted to fit within the film container, and the outside loop extends through registering slots 47, 48 respectively formed in the peripheral walls 44 and 41 of the container to connect with the loop portion. These slots are at the lower end of the downwardly projecting strip 39, and the walls 41 and 44 below said strip and at one side of the slots 47, 48 are preferably bent radially outwardly whereby the portion of loop 46 that extends between tracks 36, 38 and 40 and over strip 39 will readily slide through the slots 47, 48 and into the container in a direction substantially tangentially thereof.

The fixed head or end 42 of the film container has an arcuately formed guide plate 49 secured thereto. One end of said plate is secured to the center of said end 42 and it then curves spirally outwardly therefrom in direction generally radially of the container, and also axially in direction away from said head and through an arcuately shaped opening 50 in the closure 43. The inside coil of the spiral reel 45 of film extends over the convex side of said plate 49 and through opening 50 to outside the container for withdrawal from the center of the reel as the loop is moved longitudinally of the film for feeding back to the outside coil of the reel.

From the foregoing description, it is seen that the loop 46 and reel portion 45 of the film are substantially coplanar and are disposed vertically. The loop 46 indicated in dotted line in Figs. 2, 5 encloses the lamp housing and extends over the curved lip 37 of plate 12 and downwardly over the plate 12 between tracks 36, 38, 40 and across opening 28 and into the stationary film container.

The portion of loop 46 that extends over plate 12 is held very lightly between the tracks on said plate and against the latter by a film pressure plate 51 (Figs. 5, 7). This pressure plate 51 generally corresponds in outline with the plate 12, having a rectangular opening 52 that is adapted to register with opening 28 in plate 12. Slots 53 adjacent the upper edge of the plate 51 are adapted to receive tracks 36, and slots 54 are adapted to receive tracks 38, while an extension 55 at the lower end of the plate is adapted to extend between tracks 40. The rib 35 also coacts with one edge of plate 51 for properly positioning the latter on plate 12.

Along the edge of plate 12 that is adjacent the arm 14 that carries reflector 16, the said plate carries a leaf spring 56 (Fig. 5) that is adapted to project across plate 12 in a general direction away from said arm. The outer free end of said spring is below opening 28 and plate 51 is formed with a notch or outwardly opening recess 57 that enables the plate 51 to be slipped in position below said free end of spring 56 whereby the same will be yieldably held against said plate 12 with the tracks 36, 38 in the slots 53, 54.

The plate 51 also has a lip 58 that is opposed to lip 37 on plate 12, and that is curved oppositely to said latter lip. Also plate 53 has a projection 59 along its edge opposite the recess 57 for engagement by the fingers of an operator for swinging the plate 53 away from plate 12 for insertion or withdrawal of the film from the projector, as desired, there being sufficient space between plate 12 and the tube 30 to permit such swinging.

Carried on plate 10 on the side thereof opposite the door 4 is a train of gears 60, 61, 62 (Fig. 10). Gear 60 is secured on a drive shaft 63 that rotatably extends through plate 10. Gear 61 is an idler (preferably appreciably larger in diameter than gear 61), having its teeth in mesh with those of gear 61, while gear 62 is carried on one end of a cam shaft 64 that rotatably extends through plate 10, and which shaft carries a cam 65 at the side of plate 10 opposite gear 62. Gear 61 is rotatably carried on a pivot 66 that is secured to plate 10 and its teeth are in mesh with those of gear 62, which latter gear is relatively small in diameter, being preferably smaller than gear 60.

The cam 65 (Figs. 2, 3, 11) is generally like an equilateral triangle in outline, but with convexly rounded sides and corners and with the cam shaft connected with the cam at one of its rounded corners, whereby the cam will fit within a square opening 67 formed in one end of an arm 68 that is held flat against plate 10 by means of a disk 69 (Fig. 5) and nut 70. This disk overlies the edges of the frame in which the cam is fitted.

The said arm 68 is preferably generally horizontal and is formed with a tooth-like projection 71 projecting from the end thereof that is adjacent plate 12 and plates 12, 61 are respectively formed with vertically elongated registering recesses 72, 73 (Figs. 8, 7) along one of the sides of one of the tracks 37 and of the slot 54 that receives such track. The projection 71 extends through these recesses transversely thereof for movement longitudinally of the said recesses. When film 29 is in position between the plates 12, 51 and between tracks 36, 38, 40, the recesses 72, 73 will lie directly over the row of marginal openings 74 along one of the edges of said film, and which openings are conventional and are intended for the sprocket teeth of drive sprockets ordinarily employed in motion picture projectors.

The projection 71, as semi-diagrammatically illustrated in Fig. 11, will be moved directly downwardly from full line position to position 71a while in engagement in one of the openings 74 in the conventional film 29 upon rotating cam 65 in a clockwise direction as seen in Fig. 11. This movement is sufficient to move the film the width of each frame thereon in direction longitudinally of the film, and the relation between projection 71 and the registering rectangular openings 28, 52 in plates 12, 51 is such that each such movement of projection 71 from the full line position in Fig. 11 to position 71a will move a frame out of registration with said openings 28, 52 and will at the same time move another frame into registration with said openings.

Continued rotation of cam 65 clockwise will move projection 71 directly out of engagement with film 29 to successive dotted positions 71b, 71c, and from said latter position directly back to full line position. The path of travel of the projection is such that there is no noticeable sliding of the projection on the edges of the openings in the film, hence there is no abrasive wear on one of the edges of said opening as is common with sprockets and other mechanisms heretofore used to move the film.

This movement of projection 71 is due to the shape and position of cam 65, and also to the provision of a slot 77 formed in said arm and extending longitudinally thereof in the end of the arm that is at the side of the cam 65 opposite projection 71. A pin 78 secured to plate 10 projects through slot 77 for sliding and pivoting of the arm on and about the same as the cam is rotated.

The rotation of the cam 65 is effected through the train of gears 60, 61, 62 upon rotation of drive shaft 63. This drive shaft 63 is provided at its outer end that is adjacent door 4 with an axially outwardly opening recess 79 formed with a radially opening slot 80 in one side thereof (Fig. 5). This recess and slot are adapted to receive therein one end 81 of a crank 82 that is carried by door 4 when the door is closed, and which end 81 carries a radially projecting pin 83 adapted to fit in slot 80 upon the end 81 entering recess 79. Thus disengageable clutch elements are provided on the door and projection unit for connecting the manually actuatable crank with the gears for driving the cam 65 and thereby moving the film 26.

A spring 85 may be interposed between pin 83 and the door so as to permit axial movement of the end 81 of the crank in the event the pin 83 is not immediately in registration with the slot 80 and any suitable latch or friction device (not shown) may be provided for releasably holding the door 4 in closed position.

The crank 82 has a handle 86 outside the door for rotating the crank clockwise, as seen in Fig. 1, whereupon the cam 65 will be rotated clockwise for causing the movement thereof illustrated in Fig. 11.

Two small electric batteries 87 (only one visible in Fig. 1) are releasably secured in the cabinet by means of a spring clamp 88 or in any other suitable manner, which batteries are connected by suitable wiring with the terminals 89, 90 connecting with the light bulb when the base thereof is in socket section 22 (Fig. 9). A manually operated switch button 91 (Fig. 1) projecting from the front wall of the cabinet is in the conventional circuit (not shown) that connects the light bulb with the batteries for turning the light bulb on and off. Of course, one battery may be employed, or a plurality, as desired.

In operation, and before the cabinet is loaded with film, the process of inserting the film and of operating the projector is as follows.

The door 4 is opened, thus exposing closure 43 of the film container. The latter is removed and the endless film as seen in Fig. 3 is then placed in the cabinet, first placing the spiral reel portion 45 in the container so that the inside coil extends around the guide plate 49 and so that the outside coil extends through slot 48. The pressure plate 51 is then swung against rib 35 as a pivot so that the loop portion of the film projecting through slot 48 is between tracks 36, 38, 40 after which the plate 51 is released and will swing into position holding the said loop portion between the tracks. The remainder of loop 46 merely extends over the tubular lamp holding and enclosing housing sections 22, 23 and back to the point where it connects with the inner coil of the spiral reel portion 45. Closure 43 is then replaced on the film container so that the slot 47 is substantially in register with slot 48, and in which position the guide plate 49 will project through the arcuate slot 50 in the closure for withdrawal of the film from the center of the spiral reel part that is in the container. The door 4 is then closed and pin 83 on the end 81 of the crank will automatically engage the drive shaft 63 for driving of the cam 65 and the film engaging proection 71 therein in a direction for pushing the film from loop 46 into the film container throughout inlet opening 37, 48 while at the same time pulling the film from the container through the outlet opening 50. The track which includes the parallel plates 12 and 51, provides a buckling-resistant guide path between the feeding member and the inlet opening. The crank is revolved clockwise by the right hand of the operator while the later faces screen 6, thus making the driving of the film natural and easy. The light switch button 91 is turned to connect the light bulb in the circuit with the batteries, and upon turning the crank 82 at the desired speed, the motion picture is projected on screen 6 for viewing.

In the device illustrated in the drawings, the light bulb is of from 1.5 to 3.5 volts and uses small, pencil type batteries commonly used in very small flashlights. The screen 6 is preferably enclosed in a frame 92 that projects slightly forwardly of the screen, thereby protecting the screen against accidental injury, as well as providing for a clear picture thereon even when the projecter is operated in a relatively light room.

While the use of the hand crank for operating the projector is preferable from the standpoint of economy and durability, it is obvious that a motor could be connected with the drive shaft or cam shaft if desired.

In a motion picture projection unit of the character described, the rate at which the cam operated projecting tooth or claw 71 on arm 68 is operated when intermittently driving the film and during the interval between intermittent movements of the film is quite important in that it eliminates the necessity for a shutter, thus contributing directly to the desirable compactness of the cabinet.

The arrangement in which the light bulb carries its condenser lens integral therewith, and in which the socket section completely closes the end of the lamp housing opposite the opening 28 in plate 12 also directly contributes to the desired result of producing a compact cabinet, since it eliminates the necessity for a lamp reflector and for a condenser lens separate from the light bulb.

The arrangement of the film, particularly a continuous-rewind film, enables it to be driven by a single projection 71, even where the spiral reel portion 45 is quite large so as to provide for a relatively long film. It is to be undersood that the dotted lines indicating the film in Figs. 2, 5 are simplified for showing how the inside coil extends around the guide plate 49, inasmuch as the usual coil is on the order shown in Fig. 3. It is also to be understood that the marginal openings shown in Fig. 3 continue the length of the film, but only several are indicated in Fig. 3 to avoid complicating the view unnecessarily. The particular film shown is intended to be a conventional 8 mm. film. Where the 16 mm. size is used the openings would be along both margins, but the driving of the film need not employ the openings of both rows.

Having described the invention, I claim:

1. In a motion picture cabinet of the character described, a motion picture film projection unit within said cabinet comprising a tubular light bulb housing open at one end, a socket at the opposite end of said housing facing toward said open end for removably supporting the base of a light bulb, a light bulb having its base removably secured in said socket and formed with a condenser lens integral therewith and coaxial with said housing, means including an apertured plate adjacent the open end of said housing for supporting a motion picture film for intermittent movement thereof across said open end, means pivotally supporting said tube and socket for swinging of the said tube toward and away from said plate, said tube being removable from said means independently of said socket.

2. In a motion picture cabinet of the character described, a motion picture film projection unit within said cabinet comprising a tubular light bulb housing open at one end, a socket at the opposite end of said housing facing toward said open end for removably supporting the base of a light bulb, a light bulb having its base removably secured in said socket and formed with a condenser lens integral therewith and coaxial with said housing, means adjacent the open end of said housing for supporting a motion picture film for intermittent movement thereof across said open end, a film adapted to be so moved, said means comprising a supporting plate formed with a rectangular opening coaxial with said housing and lens and the edges of which are adapted to substantially register with the edges of each frame of said film, means for intermittently moving said film past said opening and for positioning each frame of said film substantially in register with said opening during the interval between each such movement, a film pressure plate opposed to said supporting plate, a track for said film between said supporting plate and said pressure plate for guiding the film across said opening, means for yieldably urging said pressure plate against said film, an annular-sided drum-like container positioned at one end of said track for receiving film moved past said opening, said truck extending substantially tangential to the annular sides of said container, said film being endless and a loop thereof extending from said container to the opposite end of said track for movement to said opening.

3. Projection apparatus for an endless film, said film being formed to provide a spiral reel and a loop extending therefrom with the ends of said loop respectively joined with the inner and outer coils of said reel, said apparatus comprising a stationary container adapted to receive the reel for rotation relative thereto, said container having a peripheral wall and side walls, an inlet opening for the film in said peripheral wall and an outlet opening for the film in one of said side walls, a feeding member for said film disposed externally of said container, means for supporting said loop substantially coplanar with said reel including means providing a buckling-resistant guide path for the film between said feeding member and said inlet opening, means for driving said feeding member to push the film through said guide path and into said container through said inlet opening and to pull the film out of said container through said outlet opening, and projecting means for the film.

4. Projection apparatus for an endless film, said film being formed to provide a spiral reel and a loop extending therefrom with the ends of said loop respectively joined with the inner and outer coils of said reel, said apparatus comprising a stationary container adapted to receive the reel for rotation relative thereto, said container having a peripheral wall and side walls, an inlet opening for the film in said peripheral wall and an outlet opening for the film in one of said side walls, a feeding member for said film disposed externally of said container, means for supporting said loop substantially coplanar with said reel including means providing a buckling-resistant guide path for the film between said feeding member and said inlet opening, means for driving said feeding member to push the film through said guide path and into said container through said inlet opening and to pull the film out of said container through said outlet opening, curved means for guiding the film outwardly and away from said outlet opening, and projecting means for the film.

5. Projection apparatus for an endless film, said film being formed to provide a spiral reel and a loop extending therefrom with the ends of said loop respectively joined with the inner and outer coils of said reel, said apparatus comprising a stationary container adapted to receive the reel for rotation relative thereto, said container having a peripheral wall and side walls, an inlet opening for the film in said peripheral wall and an outlet opening for the film in one of said side walls, a feeding member for said film disposed externally of said container, means for supporting said loop substantially coplanar with said reel including a pair of parallel plates providing a buckling-resistant guide path for the film between said feeding member and said inlet opening, means for driving said feeding member to push the film through said guide path and into said container through said inlet opening and to pull the film out of said container through said outlet opening, and projecting means for the film.

6. Projection apparatus for an endless film, said film being formed to provide a spiral reel and a loop extending therefrom with the ends of said loop respectively joined with the inner and outer coils of said reel, said apparatus comprising a stationary container adapted to receive the reel for rotation relative thereto, said container having a peripheral wall and side walls, an inlet opening for the film in said peripheral wall and an outlet opening for the film in one of said side walls, a feeding member for said film disposed externally of said container, means for supporting said loop substantially coplanar with said reel including a track comprising a pair of parallel plates of which one is movable away from the other for film insertion and removal, said track providing a buckling-resistant guide path for the film between said feeding member and said inlet opening, means for driving said feeding member to push the film through said guide path and into said container through said inlet opening and to pull the film out of said container through said outlet opening, and projecting means for the film.

7. Projection apparatus for an endless film, said film being formed to provide a spiral reel and a loop extending therefrom with the ends of said loop respectively joined with the inner and outer coils of said reel, said apparatus comprising a stationary container adapted to receive the reel for rotation relative thereto, said container having a peripheral wall and side walls, an inlet opening for the film in said peripheral wall and an outlet opening for the film in one of said side walls, a feeding member for said film disposed externally of said container, means for supporting said loop substantially coplanar with said reel including means providing a buckling-resistant guide path for the film extending substantially tangentially of said container from said feed member to said inlet opening, means for driving said feeding member to push the film through said guide path and into said container through said inlet opening and to pull the film out of said container through said outlet opening, and projecting means for the film.

8. Projection apparatus for an endless film, said film being formed to provide a spiral reel and a loop extending therefrom with the ends of said loop respectively joined with the inner and outer coils of said reel, said apparatus comprising a stationary container adapted to receive the reel for rotation relative thereto, said container having a peripheral wall and side walls, an inlet opening for the film in said peripheral wall and an outlet opening for the film in one of said side walls, a feeding member for said film disposed externally of said container, means for supporting said loop substantially coplanar with said reel including a track comprising a pair of parallel plates of which one is movable away from the other for film insertion and removal, said track providing a buckling resistant guide path for the film between said feeding member and said inlet opening extending substantially tangentially of said container, means for driving said feeding member to push the film through said guide path and into said container through said inlet opening and to pull the film out of said container through said outlet opening, and projecting means for the film.

JULIAN A. LINKS.

REFERENCES CITED

The following references are of record in the file of this patent:

UNITED STATES PATENTS

| Number | Name | Date |
|---|---|---|
| 1,547,747 | Grogan | July 28, 1925 |
| 1,712,996 | Hoffman | May 14, 1929 |
| 1,961,964 | Dodge | June 5, 1934 |
| 1,191,145 | Bladwin | July 18, 1916 |
| 2,012,444 | Cohn et al. | Aug. 27, 1935 |
| 2,012,445 | Cohn et al. | Aug. 27, 1935 |
| 1,774,097 | Hauser et al. | Aug. 26, 1930 |
| 2,122,804 | Tichenor | July 5, 1935 |
| 2,089,276 | Lindstrom et al. | Aug. 10, 1937 |
| 2,303,633 | Guercio | Dec. 1, 1942 |
| 1,137,912 | Sears et al. | May 4, 1915 |
| 2,031,079 | Streyckmans | Feb. 18, 1936 |
| 2,357,738 | Hartwig | Sept. 5, 1944 |

FOREIGN PATENTS

| Number | Country | Date |
|---|---|---|
| 212,763 | German | Aug. 9, 1909 |
| 422,588 | British | Jan. 15, 1935 |
| 514,613 | British | Feb. 7, 1938 |